United States Patent [19]
Binder et al.

[11] Patent Number: 5,174,711
[45] Date of Patent: Dec. 29, 1992

[54] TILTING AND LIFTING APPARATUS FOR VEHICLE BODIES

[75] Inventors: Manfred Binder, Illingen; Fritz Kübler, Aidlingen; Dieter Herrigel, Birkenfeld; Fritz Mechthold, Krefeld, all of Fed. Rep. of Germany

[73] Assignees: Mercedes-Benz AG; Aumund Fodererbau GmbH, both of Fed. Rep. of Germany

[21] Appl. No.: 656,733

[22] Filed: Feb. 19, 1991

[30] Foreign Application Priority Data

Feb. 16, 1990 [DE] Fed. Rep. of Germany ....... 4004853

[51] Int. Cl.$^5$ ............................................. B66F 7/22
[52] U.S. Cl. ................................. 414/678; 254/8 R; 254/90; 414/495
[58] Field of Search ............... 298/11; 414/678, 695, 414/495, 640, 590; 254/8 C, 9 C, 88, 90, 122, 124, 3 R, 4 R, 8 R, 8 B, 9 R, 9 B

[56] References Cited

U.S. PATENT DOCUMENTS

| | | | |
|---|---|---|---|
| 1,306,430 | 6/1919 | Klemme | 254/4 R |
| 1,615,860 | 2/1927 | Williams | 414/678 X |
| 3,623,617 | 11/1971 | Nemessanyi | 414/495 X |
| 3,844,421 | 10/1971 | Nielsen | 254/8 R X |
| 3,891,108 | 6/1975 | Traficant | 414/495 X |
| 3,902,616 | 9/1975 | Santic et al. | 298/11 X |
| 3,923,296 | 12/1975 | Oksala et al. | 414/678 X |
| 3,931,895 | 1/1976 | Grimaldo | 414/678 |
| 4,447,042 | 5/1984 | Masui | 254/90 |
| 4,901,980 | 2/1990 | Hansen | 254/90 X |

FOREIGN PATENT DOCUMENTS

| | | | |
|---|---|---|---|
| 250191 | 2/1966 | Austria | 414/678 |
| 1004782 | 3/1957 | Fed. Rep. of Germany . | |
| 1175852 | 8/1964 | Fed. Rep. of Germany . | |
| 2439903 | 3/1975 | Fed. Rep. of Germany . | |
| 3339371 | 5/1985 | Fed. Rep. of Germany . | |
| 86/06054 | 10/1986 | PCT Int'l Appl. . | |
| 741783 | 12/1955 | United Kingdom | 414/678 |

Primary Examiner—Michael S. Huppert
Assistant Examiner—Scott L. Lowe
Attorney, Agent, or Firm—Evenson, Wands, Edwards, Lenahan & McKeown

[57] ABSTRACT

A tilting and lifting apparatus for vehicle bodies for the ergonomically favorable preparation of batches of bodies in the series assembly of vehicles comprises a separate tilting device and a lifting device operable independently of the tilting device. The tilting device includes a swivelling frame which on the tilting side is swivellably guided on a pair of horizontally extending guide paths and on the lifting side on two vertically extending lifting pillars. The vehicle body is fastened rigidly on, and at a distance from, this swivelling frame, which is made as flat as possible. For the purpose of lifting this tilting device, two scissors-type lifting apparatus are disposed beneath the tilting device. The entire arrangement for the independent raising and lowering and the tilting of the body is mounted on a flat, rectangular platform on which it is possible to walk and which, in plan view, projects beyond the vehicle body to the extent of a gangway width.

13 Claims, 4 Drawing Sheets

TILTING AND LIFTING APPARATUS FOR VEHICLE BODIES

The present invention relates to a tilting and lifting apparatus for vehicle bodies for ergonomically favorable preparation of batches of bodies in the series assembly of vehicles.

A known tilting and lifting apparatus is shown in German Offenlegungsschrift 3,339,371. With the known tilting and lifting apparatus for vehicle bodies, the vehicle body is first tilted to a position in which the bottom of the vehicle body projects upwards beyond the vertical position, with a slight backward slope. The body can be raised only in this tilted position. The swivelling frame projects beyond the vehicle body at the front and rear, and projects by way of rollers into guide sectional members which are open towards the swivelling frame, while the horizontal guide path merges in a curve into the vertical guide path. The known tilting and lifting apparatus is disposed in a fixed position at the side of an assembly line for motor vehicles. The vehicle bodies destined for treatment in the apparatus are, as required, pulled sideways into the apparatus out of the line of vehicle bodies moving past. A plurality of such tilting and lifting apparatuses can be disposed one behind the other in the direction in which the vehicle bodies pass, to serve as parallel work stations.

A disadvantage of known work station arrangements is that they are provided only for certain assembly operations. For the other assembly operations, the vehicle remains in a horizontal position near the ground, which is by no means ergonomically optimum for all assembly operations.

The problem to which the present invention is addressed is the provision of a tilting and lifting apparatus for all assembly operations so that it is possible to set a position of the vehicle body which is ergonomically optimum for the assembly operation in question.

This problem has been solved according to the present invention by a tilting and lifting apparatus for vehicle bodies wherein the horizontal and the two vertical guide paths and the lifting means are integrated into an independently movable tilting device; the vertical guide paths are disposed in guide pillars which project freely upwards and a length of the vertical guide paths corresponds as a maximum to the width of the vehicle body; the tilting device is provided on its underside with a pair of scissors-type lifting means comprising a scissors-type elevating platform, the scissors-type lifting means being so configured that, without any parts thereof projecting at the top or bottom, the tilting device can be raised under load from a particularly low flat position; in the region between the horizontal guide paths lying at the ends, the tilting device is kept free of fittings over a depth, measured transversely to the longitudinal axis of the vehicle body (1) and amounting to between about 25 and 40% of the width of the vehicle body to allow unhindered access to the vehicle body when tilted at least from the lifting side; and the scissors-type lifting means are disposed on a flat platform which on its top face, at least in an edge region, is flat and permits walking, and which is rectangular in plan view and, in plan view, projects beyond the vehicle body on all sides and is provided with rollers.

Because the vehicle body can be independently tilted or raised or lowered, and because the tilting and lifting apparatus is adapted to travel on a platform, it is possible to leave the vehicle on the tilting and lifting apparatus throughout the assembly period and to convey this apparatus, together with the vehicle being assembled, slowly through the assembly line. For assembly operations close to the ground, even in the inner region, a raised working position is advantageous. For assembly operations close to the ground and deep into the interior of the vehicle, however, a raised and tilted position may be more advantageous. For assembly operations on the underside of the vehicle a horizontal raised position, a tilted lowered position or a tilted raised position may be optimum, depending on the location of the site of the assembly. All these positions can be achieved without difficulty, independently of one another, with the tilting and lifting apparatus according to the invention.

BRIEF DESCRIPTION OF THE DRAWINGS

These and further features, objects and advantages of the present invention will become more apparent form the following detailed description of a presently preferred embodiment when taken in conjunction with the accompanying drawings wherein.

DETAILED DESCRIPTION OF THE DRAWINGS

Figure 1:
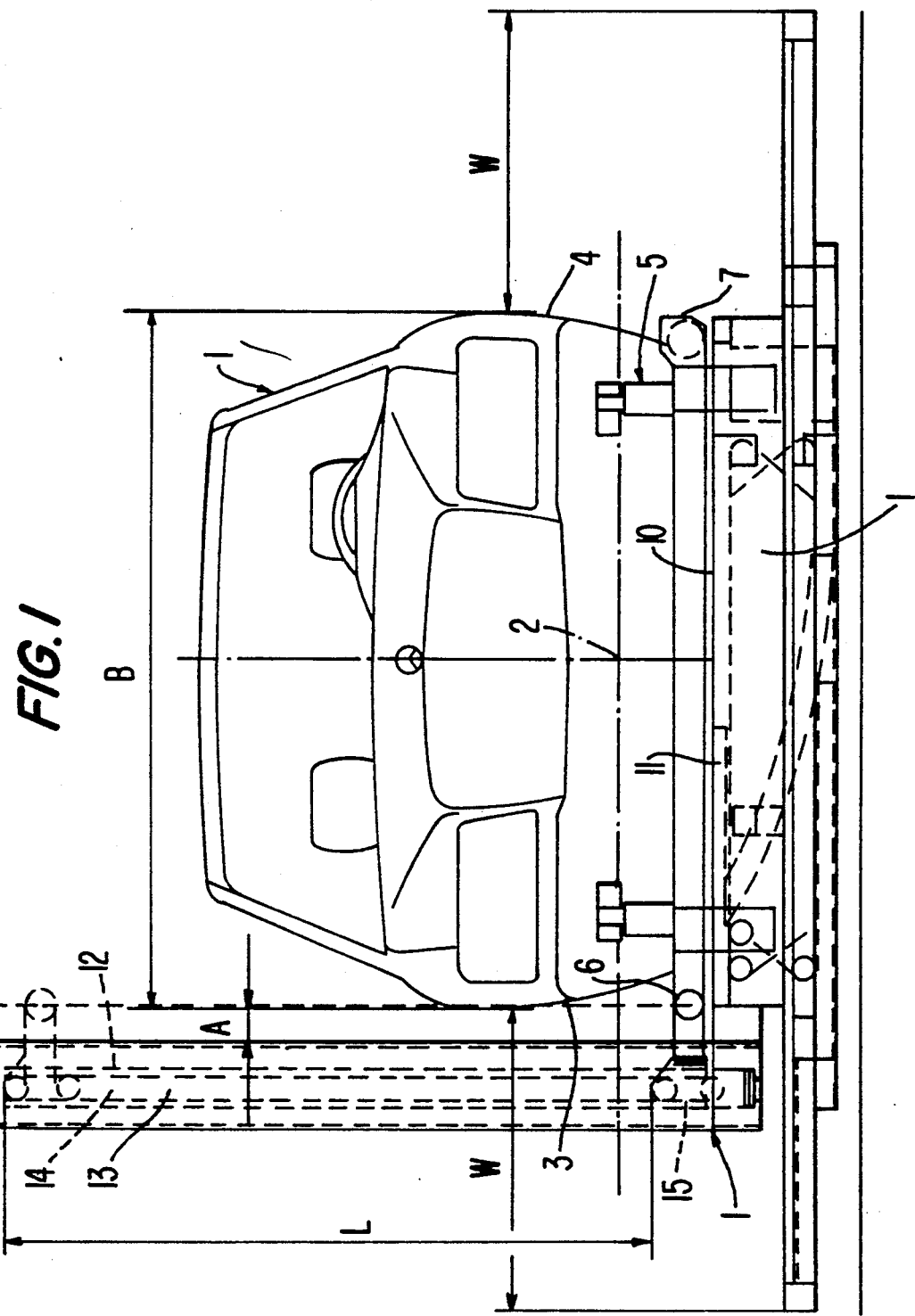
FIG. 1 is a front view of an embodiment of a tilting and lifting apparatus in accordance with the present invention in a lowered position.
Figure 2:
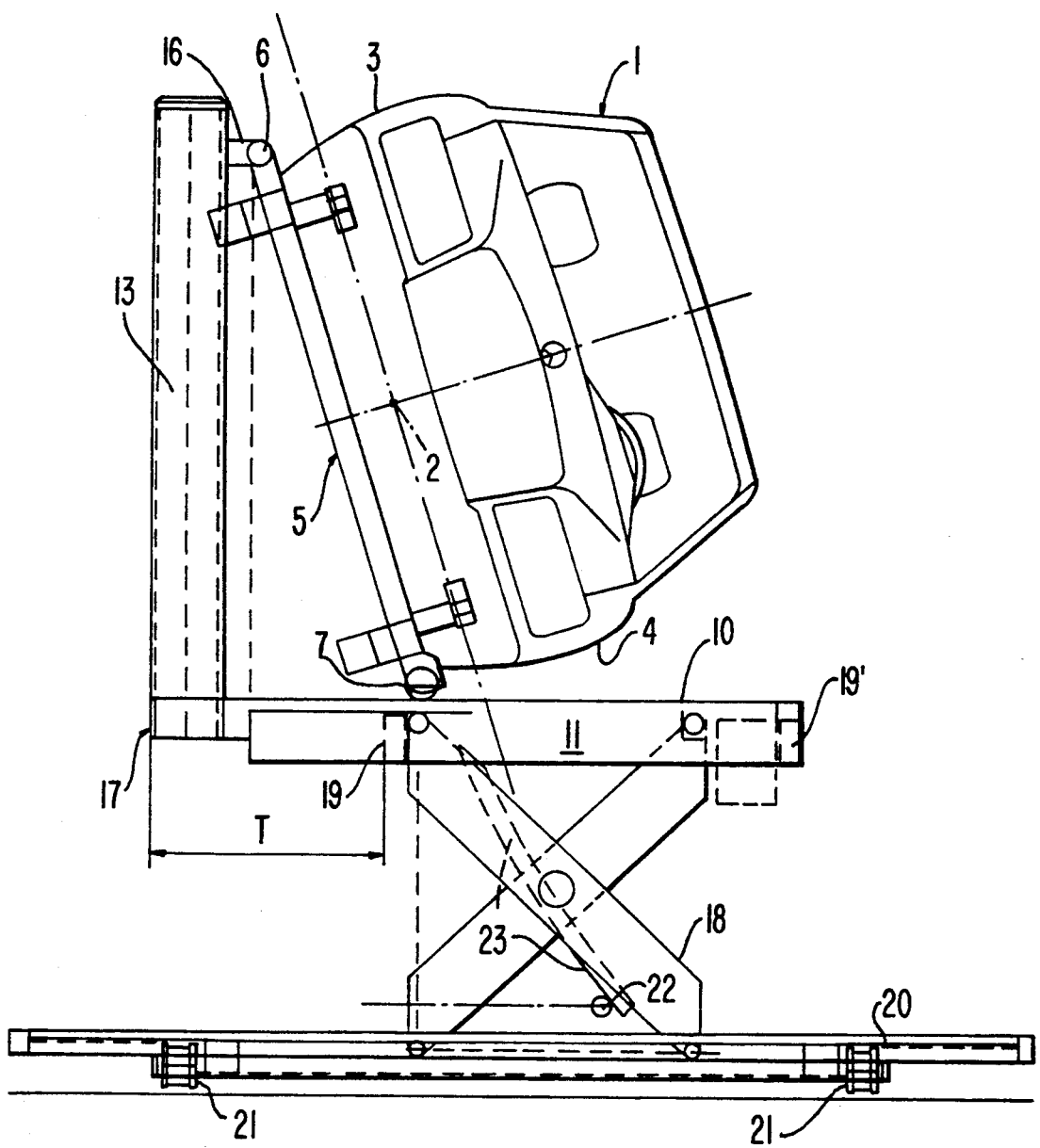
FIG. 2 is a front view of the same tilting and lifting apparatus in an upwardly tilted and raised position of the vehicle body.

The tilting and lifting apparatus serves for an ergonomically favorable preparation of vehicle bodies 1 for series assembly. The vehicle body 1 is disposed on the tilting and lifting apparatus with its longitudinal axis 2 parallel to the direction of travel of a platform 20. In the embodiment shown, the platform 20 is adapted to run with the aid of rollers 21 on rails laid on the ground. In the region of the rollers 21, two scissors-type lifting devices 18 are disposed on the platform 20 and, in turn, carry at the top the horizontal bearers 11 of a tilting device 17. The tilting device itself contains a swivelling frame 5 which finally secures the vehicle body. For tilting the vehicle body 1, one side of the swivelling frame 5 and of the vehicle body 1 is raised, for which reason this side will be referred to as lifting side 3; the opposite side is essentially tilted, and for this reason that side will be referred to as tilting side 4.

Figure 3:
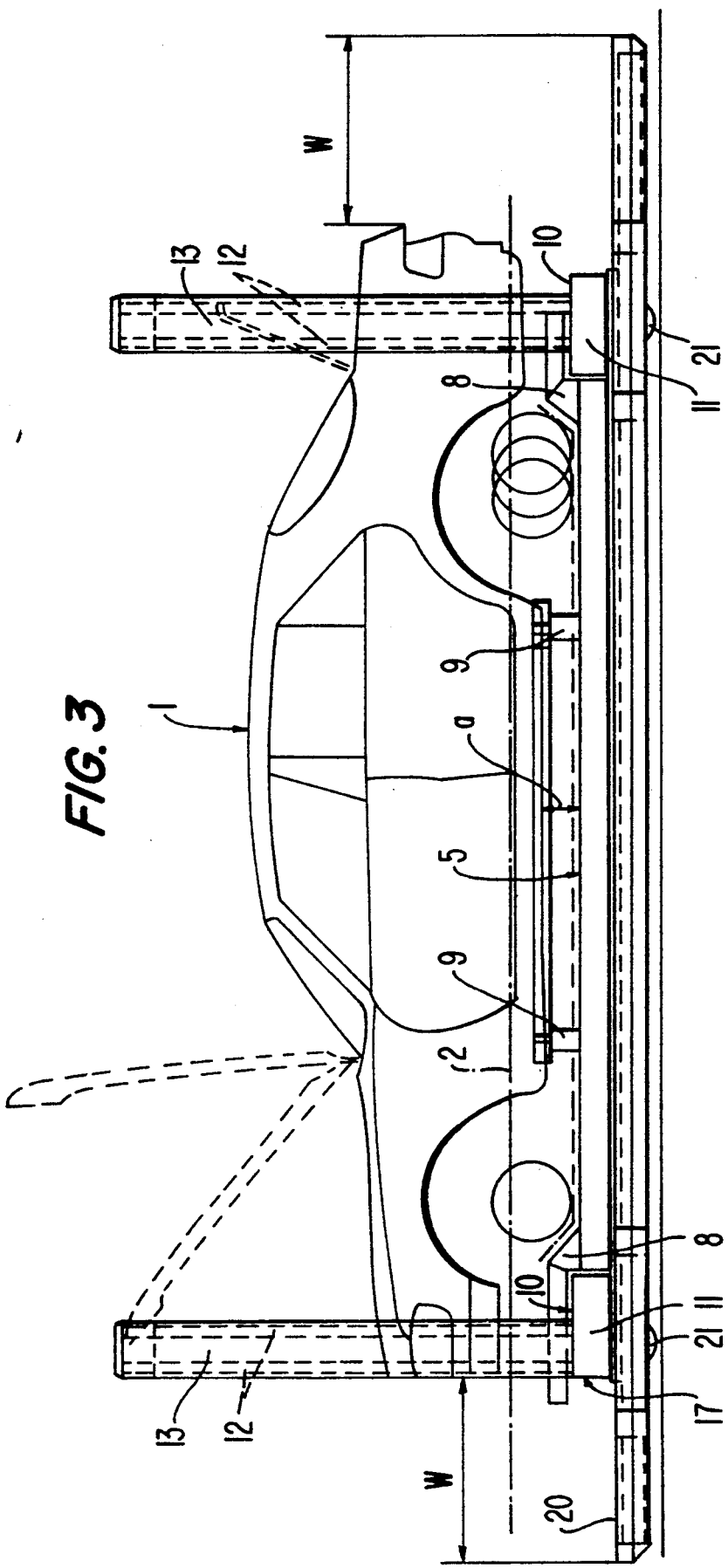
FIG. 3 is a side view of the tilting and lifting apparatus in the lowered position as shown in FIG. 1.

The swivelling frame 5 is made as flat as possible and is rigidly fastened to the bottom of the body, at a distance a therefrom (FIG. 3), by spacers 9. This clearance from the bottom of the body reduces to a minimum the obstruction by the swivelling frame 5 of access to the bottom of the body. In order to enable the lowest possible position of the vehicle body to be set when the body is in the lowered position, the swivelling frame 5 is provided with cranked portions 8 in the region of the horizontal bearers 11 (FIG. 3), which will be described in greater detail later on, so that the swivelling frame 5 can be lowered between the two horizontal bearers 11 extending transversely to the longitudinal axis 2 of the vehicle.

Figure 4:
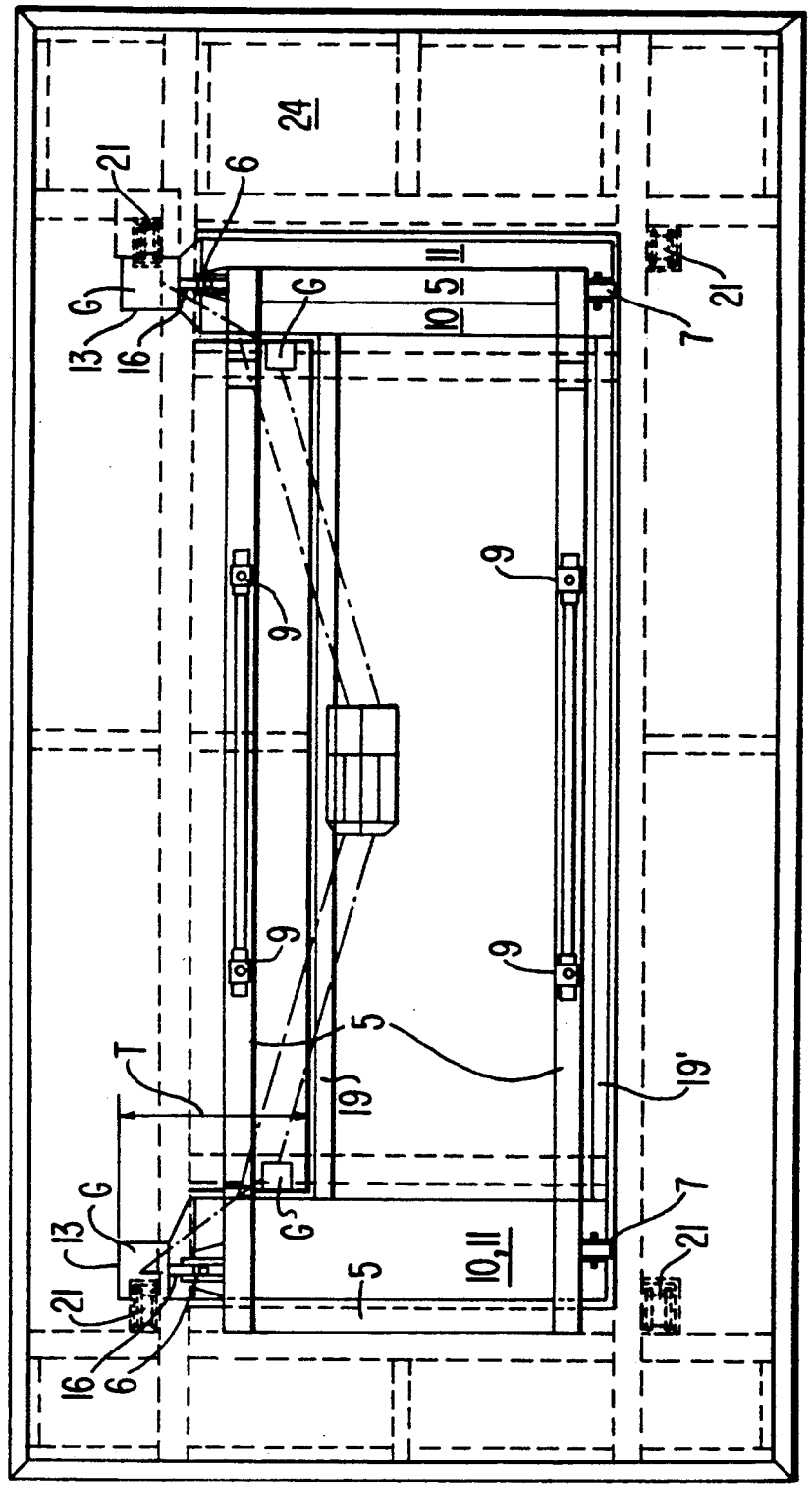
FIG. 4 is plan view of the tilting and lifting apparatus in the lowered position.

The swivelling frame 5 itself is constructed, in the plan view shown in FIG. 4, substantially as a rectangular frame, so that the underside of the vehicle body is accessible with the least possible obstruction. The tilting side 4 of the swivelling frame 5 carries, in the region of each of the horizontal bearers 11, a roller 7 which is exposed and by which the swivelling frame 5 can run on a horizontal guide path 10 formed on the top face of the horizontal bearer 11. The swivelling frame 5 can thus be swivellably guided on the horizontal bearer 11 in a simple manner.

In the region of the lifting side 3, the swivelling frame 5 is swivellably guided in a pair of vertically extending guide paths 12 inside a guide pillar 13 which is in the form of a longitudinally slit guide channel of almost closed cross-section, in which a shoe 15 is axially guided. The shoe 15 projects by way of a bracket 16 through the longitudinal slit in the direction of the swivelling frame 5, and there carries a swivel joint 6 on which the bracket 16 is swivellably connected to the swivelling frame 5. The guide pillar 13 is at a lateral distance A from the lifting side 3 of the vehicle body 1, so that also in this region the vehicle body is accessible without difficulty in the horizontal position.

In the interior of the guide channel, each shoe 15 is acted on by a lifting apparatus which in the embodiment illustrated is in the form of a lifting spindle 14. Because of this exposed pivoting of the swivelling frame 5 on the horizontal and vertical guide paths 10 and 12, respectively, the swivelling frame 5 configured and sized to the vehicle body can also be easily exchanged in the tilting device 17. In the region of the horizontal guide path, the frame 5 merely rests loosely in place with its roller 7. It is connected to the bracket 16 at the swivel joint 6 only by a swivel pin which in certain cases can be extracted axially. As required, the tilting device 17 can thus rapidly be equipped with a swivelling frame 5 suitable for a different body. It is even conceivable that, with a corresponding easily exchangeable design of the swivel joint 6, a so-called mixed operation can be carried out in the final assembly with a series of tilting and lifting apparatuses having different swivelling frames 5 and correspondingly different vehicle bodies. In a preparatory step, associated swivelling frames and vehicle bodies can be brought together and introduced into the tilting and lifting apparatus.

In order to be able to tilt the vehicle body 1 independently of the lifting movement in the desired manner, the two horizontal bearers 11 and the two vertical guide pillars 13, as well as the related lifting apparatus, are integrated into an inherently stiff movable tilting device 17 which itself withstands the loads occurring. In this case the vertical guide pillars 13 project freely upwards from the tilting device 17, the length L of their guide path corresponding as a maximum to the width B of the body. In the embodiment illustrated, the length of the guide path is even less than the width of the body, because the latter must not be tilted into a position in which its bottom is vertical. The driving engine of the vehicle is in fact already installed in the body and, because of the oil contained in it, will tolerate only a maximum tilting position of up to 75° without the oil running out. Even the 75° position permits, however, good access to the underside of the vehicle. The relatively short length of the vertical guide pillar 13 allows it to be kept relatively rigid even without support at the top, that is to say even when projecting freely upwards. For reasons of cost, the vertical guide pillars 13 will consist of commercially available lifting pillars for vehicle lifting platforms, these pillars being integrated into the tilting device 17.

Of the two horizontal 11 and vertical guide pillars 13, one horizontal bearer 11 and one vertical guide pillar 13 are in each case disposed in approximately identical position in the longitudinal direction of the vehicle, the two parts mentioned being joined together to form a rigid angle. The two angles formed in this manner are connected together in the embodiment illustrated in the region of the horizontal bearer 11 by two connecting bearer 19 and 19' extending in the longitudinal direction of the vehicle, thereby forming the inherently stiff tilting device 17. The connecting bearer 19 situated on the lifting side is set back, relative to the lifting side 3 of the tilting device 17, by a distance T in order to permit access with the least possible hindrance to the bottom of the tilted and raised vehicle body. The two horizontal bearer 11 are therefor kept completely free of fittings over the depth T on the lifting side. This access depth corresponds to about 25 to 40% of the width B of the body.

The longitudinal bearer 19' on the tilting side can also be dispensed with entirely, thereby substantially improving accessibility to the body from the tilting side 4. The remaining bearer 19 serves merely to enable the two above mentioned angles consisting of bearers 11 and guide pillars 13 to be stiffened in the longitudinal direction against tipping relative to each other, so that the two angles, seen in side view in FIG. 3, cannot tilt in the longitudinal direction of the vehicle. The scissors-type lifting means 18 also make, however, a contribution in this respect, since each of these lifting means has a certain guide width in the longitudinal direction of the vehicle.

The longitudinal bearer 19 also provides a certain protection against a mutual twisting of the two angles defined by bearers 11 and pillars 13, although the angles are only slightly subject to this danger because of the synchronously driven scissors-type lifting apparatuses 18 which ensure good parallel guidance. Apart from the mutual stabilization of the two angles, the longitudinal bearer 19 also serves to provide space-saving and protected accommodation of the drive for the lifting pillars 13 and a shaft for synchronization between the two. This shaft ensures exact synchronization of the two lifting pillars 13 with the interposition of angular gearing in each case.

The two previously mentioned scissors-type lifting apparatuses 18 for raising the tilting device 17 are disposed, offset in the longitudinal direction of the vehicle, between the tilting device 17 and the platform 20. The two horizontal bearers 11, together with the two connecting bearer 19 and 19' extending in the longitudinal direction, can be raised and lowered like a scissors-type elevating platform by the two scissors-type lifting apparatuses 18. In plan view shown in FIG. 3, the two scissors-type lifting apparatuses 18 lie in identical positions relative to the two horizontal bearer 11. In a certain region the bearers 11 are open in the downward direction and in that region have a U-shaped cross-section, so that they can each accommodate a scissors-type lifting apparatus 18 in a space-saving manner. This location of the scissors-type lifting apparatuses, relative to the horizontal bearers 11, in identical positions in plan view is provided not only for reasons of space but also for static reasons; in this arrangement, the force flow paths are the simplest and shortest and for this reason also provide optimum loadability. Concertina-type bellows are disposed on each side of the scissors-type lifting apparatus 18 and on the shorter sides, extending vertically in each case, in order to provide protection against contact, although this is not illustrated.

In order to be able to lower the tilting device 17 as far as possible down onto the platform 20 so that the roof region of the vehicle body will also be easily accessible, use is made of those known scissors-type lifting apparatus which can be raised under load even from a particularly low flat position without any parts projecting at the top or bottom. Scissors-type lifting apparatus of this kind can be obtained on the market as units ready for installation. In this connection reference is made to EP-OS 252 086 or DE-AS 11 75 852. In the case of the scissors-type lifting apparatus in the present embodiment, a guide path 23 is provided on one lever of the scissors for an expander roller and, in the flat position of the two scissors levers, forms with a coacting stationary path a very acute-angled expansion gusset into which a horizontally guided expander roller 22 can be pushed. In this way, the scissors-type lifting apparatuses can be raised from an extreme flat position, even under load, without requiring any parts projecting at the top or bottom. The two scissors-type lifting apparatuses are driven synchronously with each other, with the drive or drivers being housed in the platform 20. Here again, synchronism is expediently achieved with the aid of a synchronization shaft.

In order to enable assembly operations to be carried out while the platform and vehicle body are moving slowly forward, even when the workmen are stationary, the platform 20 projects in plan view all around the vehicle body 1 by a width W (see FIGS. 1 and 3) which is sufficient to allow comfortable walking all around the vehicle body 1. The worker does not then need to walk along with the vehicle body while carrying out his assembly task, but can do his work while remaining stationary. A plurality of platforms adjoining one another and conjointly moved on a conveyor line form a continuous moving standing space. In order to avoid a step at the edge on the longitudinal side of the platforms, large walkways are constructed there at the same height as the platform, so that as a whole a flat area on which it is possible to walk and which has a moving center strip is formed in the region of the tilting and lifting apparatuses.

In the embodiment illustrated, the platform is movable with the aid of rollers 21 on rails laid on the ground, while the row of platforms is pushed as a single unit through the assembly line. At the beginning of the assembly line, a new platform is in each case placed in position as required and pushed into the row at the end of the assembly line the last platform, which has been braked, is in each case taken out, moved aside and transferred to an oppositely directed assembly line lying parallel so that a closed cycle of platforms is formed. Instead of horizontal guiding of the platform on integral rollers, it is also conceivable for the platform to be constructed without rollers but with guide rails on its underside, these rails in turn running on a row of carrier rollers laid on the ground.

Power for supplying the tilting and lifting drives is fed via contact tracks laid on the ground in a protected arrangement, in which sliding contacts on the platform engage. In the less heavily loaded region W of the gangway around the vehicle body, the profile height of the supporting cross-sections can be lower than in the central area of the platform. In the edge region a continuous free space is left on the underside, both on the left and on the right for a multiple arrangement of contact paths on the ground, the height of these free spaces being sufficient to enable four contact paths to be disposed one above the other in each case in these positions. Of the total of eight contact paths, four are intended for the three-phase current supply and four other for control purposes. In one of the compartments 24 of the lattice work frame of the platform 20, a switch cabinet can be disposed for housing control parts for the drive motors and the like.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Tilting and lifting apparatus for vehicle bodies for selectively raising and lowering a first external side surface of a vehicle body on one side of a vehicle longitudinal axis and tilting a second external side surface of the vehicle body on another side of the vehicle longitudinal axis towards the ground, comprising a flat swivelling frame disposed a distance form and approximately parallel to the bottom of the vehicle body and having means for rigidly fastening the vehicle body thereto; a first pair of guide tracks extending horizontally under the vehicle body and transversely to the vehicle longitudinal axis such that one side of the swivelling frame is guided at one side thereof, said first pair of guide tracks in plane view, lying proximate the second external side of the vehicle body when tilted towards the ground a second pair of guide tracks disposed approximately vertically and at a side of the swivelling frame which, in plane view, lays near the first external side surface of the vehicle body; a pair of scissor-type lifting devices provided at the second pair of guide tracks for raising and lowering the swivelling frame on only one of the vehicle sides, wherein the lifting devices are independently movable with respect to the first and second pairs of guide tracks; vertical guide pillars being provided in which the second pair of guide tracks are disposed, said vertical guide pillars project upwards with a free end and have a length which is no greater than the width of the vehicle body; a platform, means for moving the platform along a supporting surface, the pair of scissors-type lifting devices being mounted between the platform and the swivelling frame and being so configured that the tilting and lifting apparatus can be raised with the vehicle body on the swivelling frame from a low, flat position thereof; a region between the first pair of guide tracks being free of obstructions over a distance, measured transversely to the vehicle longitudinal axis, mounting to between about 25 and 40% of the width of the vehicle body to allow unhindered access to the vehicle body when tilted and the platform having on its top face, at least an edge region thereof which is flat to permit walking thereon and which, in plan view, is rectangular and projects beyond the vehicle body on all sides.

2. The tilting and lifting apparatus according to claim 1, wherein each guide track of the second pair of guide tracks comprises a substantially closed, longitudinally slit guide channel, a shoe guide in the longitudinally slit guide channel and a bracket projecting through the longitudinally slit guide channel in the direction toward the swivelling frame, which swivelling frame is swivellably articulated on a side thereof adjacent the first external side surface to an outer end of the bracket.

3. The tilting and lifting apparatus according to claim 2, wherein each guide track of the first pair of guide tracks comprises a roller which is exposed along a side of the swivelling frame adjacent the second external side surface when tilted towards the ground and a bearer which has a flat top face and a rectangular cross-section.

4. The tilting and lifting apparatus according to claim 1, wherein a roller and a bearer are provided on each guide track of the first pair of guide tracks and effect the guiding, on a side of the swelling frame adjacent the second external side surface when tilted towards the ground, each roller being exposed along the side of the swivelling frame and each bearer having a flat top face and having a rectangular cross-section.

5. The tilting and lifting apparatus according to claim 4, wherein each bearer of the first pair of guide tracks has a top face which forms a horizontal guide path and is open in a region on its underside, which region has a substantially U-shaped profile to receive one end of the scissors-type lifting devices in the open region.

6. The tilting and lifting apparatus according to claim 5, wherein each guide track of the second pair of guide tracks comprises a substantially closed, longitudinally slit guide channel, a shoe guide in the longitudinally slit guide channel, and a bracket projecting through the longitudinally slit guide channel in the direction toward the swivelling frame which swivelling frame is swivellably articulated on a side thereof adjacent the first external side surface to an outer end of the bracket.

7. The tilting and lifting apparatus according to claim 4, wherein each bearer of the first pair of guide tracks forms a horizontal guide path, each of the vertical guide pillars and each scissors-type lifting device are approximately aligned as viewed in the vehicle longitudinal direction, and each bearer of the first pair of guide tracks and each vertical guide pillar together form a rigid angle connected by at least one connecting bearer extending in the vehicle longitudinal direction in a region of the bearers forming the horizontal guide path.

8. The tilting and lifting apparatus according to claim 7, wherein each guide track of the second pair of guide tracks comprises a substantially closed, longitudinally slit guide channel, a shoe guided in the longitudinally slit guide channel and a bracket projecting through the longitudinally slit guide channel in the direction toward the swivelling frame, which swivelling frame is swivellably articulated on a side thereof adjacent the first external side surface to an outer end of the bracket.

9. The tilting and lifting apparatus according to claim 8, wherein each bearer of the first pair of guide tracks has a top face which forms a horizontal guide path and is open in a region units underside, which region has a substantially U-shaped profile and receives on end of the scissors-type lifting devices in the open region.

10. The tilting and lifting apparatus according to claim 4, wherein the vertical guide pillars are of identical configuration.

11. The tilting and lifting apparatus according to claim 10, wherein each guide track of the second pair of guide comprises a substantially closed, longitudinally slit guide channel, a shoe guided in the longitudinally slit guide channel and a bracket projecting through the longitudinally slit guide channel in the direction toward the swivelling frame which swivelling frame is swivellably articulated on a side thereof adjacent the first external side surface to an outer end of the bracket.

12. The tilting and lifting apparatus according to claim 11, wherein each bearer of the first pair of guide tracks has a top face which forms a horizontal guide path and is open in a region on its underside, which region has a substantially U-shaped profile and receives one end of the scissors-type lifting devices in the open region.

13. The tilting and lifting apparatus according to claim 12, wherein each bearer of the first pair of guide tracks forms a horizontal guide path, each of the vertical guide pillars and each scissors-type lifting device are approximately aligned as viewed in the vehicle longitudinal direction, and each bearer of the first pair of guide tracks and each vertical guide pillar together form a rigid angle connected by at least one connecting bearer extending in the vehicle longitudinal direction in a region of the bears forming the horizontal guide path.

* * * * *